United States Patent [19]
Takaiwa

[11] Patent Number: 5,329,362
[45] Date of Patent: Jul. 12, 1994

[54] COLOR VIDEO CAMERA USING COMMON WHITE BALANCE CONTROL CIRCUITRY IN NEGATIVE AND POSTIVE IMAGE PHOTOIMAGING MODES

[75] Inventor: Kan Takaiwa, Tokyo, Japan

[73] Assignee: Canon Kabushiki Kaisha, Tokyo, Japan

[21] Appl. No.: 42,453

[22] Filed: Apr. 5, 1993

Related U.S. Application Data

[63] Continuation of Ser. No. 875,595, Apr. 28, 1992, abandoned, which is a continuation of Ser. No. 516,568, Apr. 30, 1990, abandoned.

[30] Foreign Application Priority Data

May 12, 1989 [JP] Japan ................... 1-117201
May 12, 1989 [JP] Japan ................... 1-117202
May 12, 1989 [JP] Japan ................... 1-117203

[51] Int. Cl.[5] .................. H04N 9/73; H04N 9/04; H04N 9/11
[52] U.S. Cl. .................. 348/228; 348/223; 348/241; 348/222; 348/234; 348/96; 348/104; 348/257

[58] Field of Search ............ 358/76, 54, 41, 102, 358/29, 29 C, 161, 209, 163, 211, 43, 44, 214, 506, 527, 185; H04N 9/04, 9/64, 7/18, 9/73, 9/11

[56] References Cited

U.S. PATENT DOCUMENTS 4,608,595  8/1986  Nakayama et al. ............... 358/29 C
4,635,101  1/1987  Nakayama ....................... 358/21 R
4,638,350  1/1987  Kato et al. ..................... 358/29 C Primary Examiner—James J. Groody
Assistant Examiner—Safet Metjahic
Attorney, Agent, or Firm—Robin, Blecker, Daley & Driscoll

[57] ABSTRACT

A color video camera having an automatic white balance adjusting function and operating with selection of modes including a negative-to-positive reversal mode of shooting the color negative film to obtain the positive picture, wherein in the negative-to-positive reversal mode, the color signals output from the image sensor are amplified by the amplifiers whose gains have been changed from the values for an ordinary object shooting mode to values suited for shooting the negative film.

31 Claims, 4 Drawing Sheets

COLOR VIDEO CAMERA USING COMMON WHITE BALANCE CONTROL CIRCUITRY IN NEGATIVE AND POSTIVE IMAGE PHOTOIMAGING MODES

This is a continuation application under 37 CFR 1.62 of prior application Ser. No. 875,595, filed Apr. 28, 1992 now abandoned which is a continuation application under 37 CFR 1.62 of prior application Ser. No. 516,568, filed Apr. 30, 1990, now abandoned.

BACKGROUND OF THE INVENTION

1. Field of the Invention

This invention relates to color video cameras and, more particularly, to such cameras which have the function of automatically adjusting the white balance in TTL mode and are capable of obtaining a positive picture from the negative film.

2. Description of the Related Art

The conventional automatic white balance adjusting methods for color video cameras may be divided into two large groups employing (i) the external colorimetry and (ii) the TTL colorimetry. Of these, the automatic white balance adjustment of the TTL type the output signal of the image sensor, based on which the white balance is controlled and, therefore, produces no errors, from which the external colorimetry type suffers, due to the difference in the spectral characteristic between the colorimeter and the image sensor and, in the case of the interchangeable-lens type camera, the change of the spectral characteristic as the lens is interchanged with another one. Accordingly, the latter has widely been utilized.

FIG. 1 is a block diagram illustrating the construction of the conventional automatic white balance adjusting circuit of the TTL type in the color video camera. An image sensor using a CCD or the like produces three output signals of the three primary colors R (red), G (green) and B (blue). Of these, the R and B signals are amplified by white balance control amplifiers 2 and 3, respectively. The color signal G and the outputs of the amplifiers 2 and 3 all are supplied to each of a Y processing circuit 4 for producing a luminance signal (Y signal) and a C processing circuit 5 for producing color-difference signals. The color-difference signals output from the C processing circuit 5 are supplied to a balanced modulator 6 which receives other inputs of color subcarrier signals $f_{SC1}$ and $f_{SC2}$ of 90° phase difference. The output of the .modulator 6, or the chrominance signal (C signal), and the output of the Y processing circuit 4, or the luminance signal (Y signal), are added in an adding circuit 7. A detecting circuit 8 detects a high-luminance portion (peak value) of the luminance signal output from the Y processing circuit 4. The color-difference signals output from the C processing circuit 5 are also supplied to sample-and-hold (S/H) circuits 9 and 10 and integration circuits 11 and 12. A white balance control circuit 13 controls the gains of the amplifiers 2 and 3 individually through a control voltage conversion circuit 14.

With the camera of such construction, light coming from an object to be photographed forms an image on the image sensor 1 where it is photoelectrically converted into electrical signals. From this image sensor 1, the electrical signals are output for each of the colors R, G and B. Of these, the R signal and the B signal, after their amplitudes have been controlled by the amplifiers 2 and 3 for white balance control respectively, are supplied to each of the Y processing circuit 4 and the C processing circuit 5. The G signal is supplied without further alteration to the Y processing circuit 4 and the C processing circuit 5. And, the luminance signal (Y signal) is output from the Y processing circuit 4, while the color-difference signals R-Y and B-Y are output from the C processing circuit 5.

The aforesaid color-difference signals R-Y and B-Y are supplied to the balanced modulator 6, where they are subjected to balanced modulation by using the color subcarrier signals $f_{SC1}$ and $f_{SC2}$ of 90° phase difference, and are output as a chrominance signals (C signal). Then, this chrominance signal and the above-described luminance signal (Y signal) are mixed in the adding circuit 7, and therefrom a composite video signal is output, which is supplied to a reproduction circuit (not shown).

Here, the above-described composite video signal is of such a form that the white balance has been adjusted by the amplifiers 2 and 3 for white balance control. That is, in order to adjust the white balance, the high-luminance portion of the luminance signal output from the Y processing circuit 4 is first detected. By using that detection signal, the sample-and-hold circuits 9 and 10 carry out sampling of the color-difference signals R-Y and B-Y. At the same time, the integration circuits 11 and 12 carry out the integration of the color-difference signals R-Y and B-Y. Then, the white balance control circuit 13 controls the gains of the amplifiers 2 and 3 in such a manner that the values $R-Y_{peak}$ and $B-Y_{peak}$ of the color-difference signals obtained by the aforesaid sampling in the peak (high-luminance portion) of the luminance signal, or the average values $R-Y_{Ave}$ and $B-Y_{Ave}$ of the color-difference signals obtained by integrating them for one picture. Thus, the adjustment is made so as to obtain always optimum white balance. In this connection, it should be pointed out that each of the amplifiers 2 and 3 is controlled through the control voltage conversion circuit 14, and that these amplifiers 2 and 3 are in the form of voltage-controlled amplifiers. Hence, the gain is controlled by the DC voltage applied to the control terminal.

FIG. 2 shows the details of the conventional control voltage conversion circuit 14. The output terminals (ROUT, BOUT) 13a and 13b of a D/A converter in the white balance control circuit 13 are connected respectively through resistors $R_1$ and $R_2$ to bleeders of resistors $R_3$ and $R_4$ and resistors $R_5$ and $R_6$ connected across a D.C. electric power source of 5 volts.

From one of the output terminals of the D/A converter in the white balance control circuit 13, say, 13a, a D.C. voltage which takes a value in the range of from 0 to 5 volts depending on the above-mentioned values $R-Y_{peak}$ and $B-Y_{peak}$ of the color-difference signals is output. For this D.C. voltage, the width of variation is changed according to the impedance ratio of the resistor $R_1$ and the bleeder of resistors $R_3$ and $R_4$, and the value of the center of the width of variation is determined by the ratio of the resistance $R_3$ and $R_4$ of the bleeder, before it is applied to the control terminal (RCONT) 2a of the amplifier 2 for white balance control. Likewise, at the other output terminal 13b of the D/A converter in the white balance control circuit 13, there also appears a D.C. voltage, which, after the width of variation and its central value have been determined by the values of the resistor $R_2$ and the bleeder resistors $R_5$ and $R_6$, is applied to the control terminal (BCONT) 3a of the amplifier 3 for white balance control. And, the values of the resistors $R_1$ to $R_6$ are previously set so that the central values and the variation widths of these D.C. voltages become optimum in a prescribed color temperature range (usually 3000° K. to 7000° K.).

Because, in such a conventional color video camera as described above, however, the gain of the amplifier for white balance control is fixed, if, as the color negative film is shot to obtain a positive picture, the picture is inverted, the gain of the amplifier for white balance control does not become a proper value. This leads to a problem in that the optimum white balance adjustment cannot be assured.

Also, in the conventional color video camera described above, the luminance signal output from the Y processing circuit 4 is supplied as it stands to the above-described detecting circuit 8 so that the high-luminance portion is detected. When the color negative film is shot to obtain a positive picture, therefore, the high-luminance portion of the luminance signal cannot reliably be detected. This contributes to a problem of failing to attain an optimum white balance adjustment.

Furthermore, in the conventional color video camera described above, the color signals output from the image sensor 1 are supplied directly to the amplifiers 2, 3 and the processing circuits 4, 5. When a color negative film is shot to obtain the positive picture, the influence of the film base which is a colored orange system cannot be removed. This contributes to a problem in that the white balance cannot accurately be adjusted.

SUMMARY OF THE INVENTION

With such problems in mind, the present invention has been made, and its object is to provide a color video camera which can assure optimum adjustment of the white balance at all times by changing the gain of the amplifier for white balance control between two values for an ordinary object shooting mode and a negative-to-positive reversal mode.

According to the invention, in an embodiment thereof, a color video camera having an automatic white balance adjusting function is made to operate with a selection of modes including the negative-to-positive reversal mode in which the color negative film is shot to obtain a positive picture. When selecting this negative-to-positive reversal mode, the gains of the amplifiers for white balance control that amplify the color signals output from the image sensor are changed from the values for the ordinary mode of shooting an object to be photographed to values which are suited for shooting the negative film.

Since, in such a color video camera of the embodiment, the gains of the amplifiers for white balance control have values suited for shooting the negative film at the time of operating the negative-to-positive reversal mode, the white balance adjustment can always be made optimum.

Another object of the invention is to provide a color video camera which, even when in the negative-to-positive reversal mode, can assure normal detection of the high-luminance portion of the luminance signal, so that the white balance can always be adjusted to optimum.

According to the invention, in another embodiment thereof, a color video camera having an automatic white balance adjusting function is made to operate with a selection of one of two modes including the negative-to-positive reversal mode in which the color negative film is shot to obtain a positive picture, and, in the negative-to-positive reversal mode, the luminance signal is inverted in polarity to detect the high-luminance portion thereof, and the detection signal is used for sampling the color-difference signals to control the white balance.

Since, in the color video camera of this embodiment, in the negative-to-positive reversal mode, the high-luminance portion of the luminance signal of inverted polarity is detected and the sampling of the color signals is performed by the detection signal, the normal detection of the high-luminance portion of the luminance signal is assured. Thus, the optimum white balance adjustment can always be done.

Yet another object of the invention is to provide a color video camera which can remove the influence of the coloring of an orange system of the color negative film in the negative-to-positive reversal mode so that the optimum white balance adjustment can always be done.

According to the invention, in an embodiment thereof applied to a color video camera having an automatic white balance adjusting function and having a negative-to-positive reversal mode for obtaining a positive picture by shooting the color negative film, when selecting the negative-to-positive reversal mode, the white balance control is effected after the influence of the film base which is a colored orange system has been removed by shifting the level of the color signals output from the image sensor.

Since, in the color video camera of this embodiment, the white balance control in the negative-to-positive reversal mode is done after the level of the color signals output from the image sensor has been shifted, the colors of an orange system of the color negative film does not affect it, so that the optimum white balance adjustment can always be done.

Other objects and features of the invention will become apparent from the following drawings and written specification.

DETAILED DESCRIPTION OF THE PREFERRED EMBODIMENT

Figure 1:
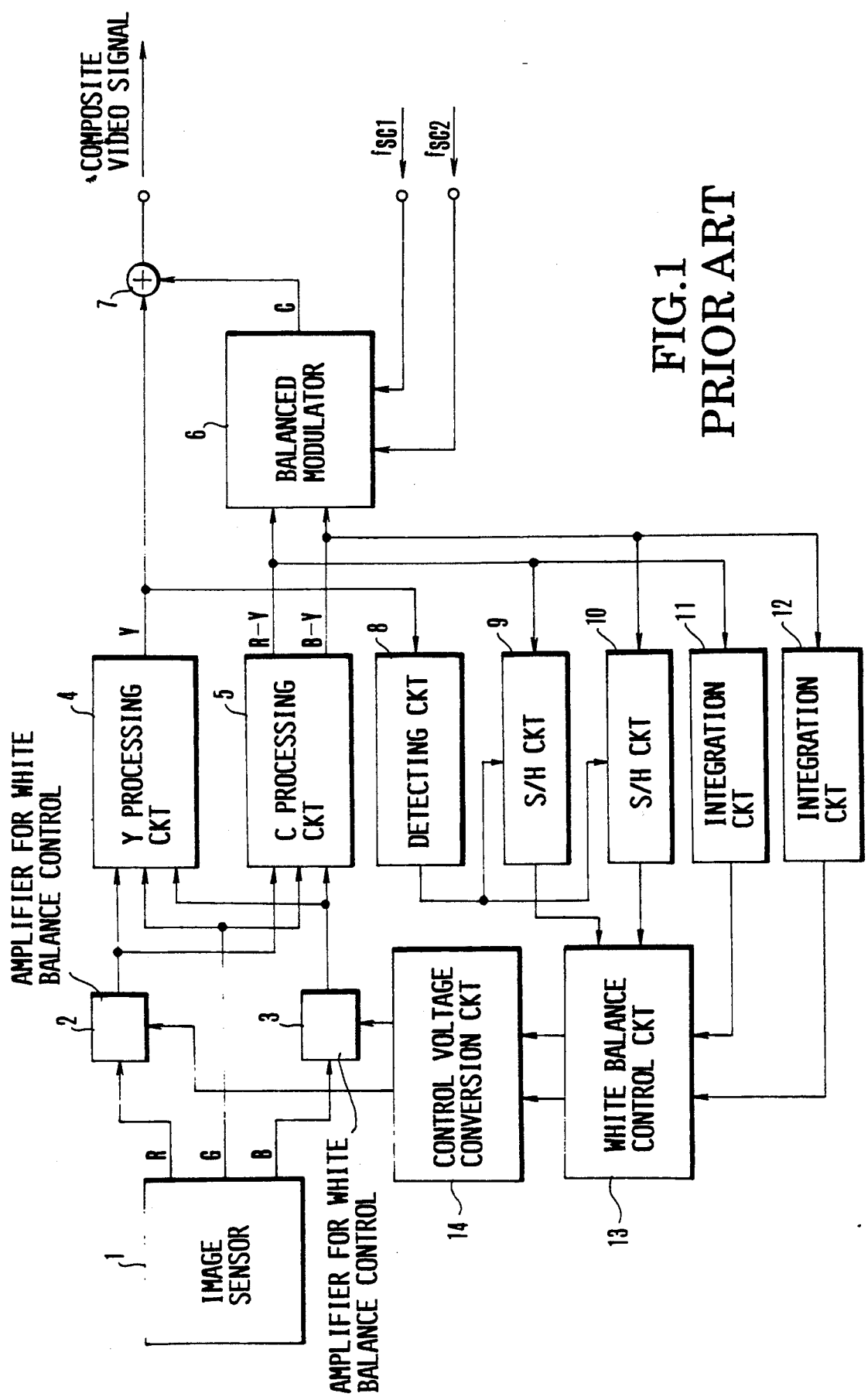
FIG. 1 is a block diagram illustrating the circuitry of the conventional color video camera.
Figure 3:
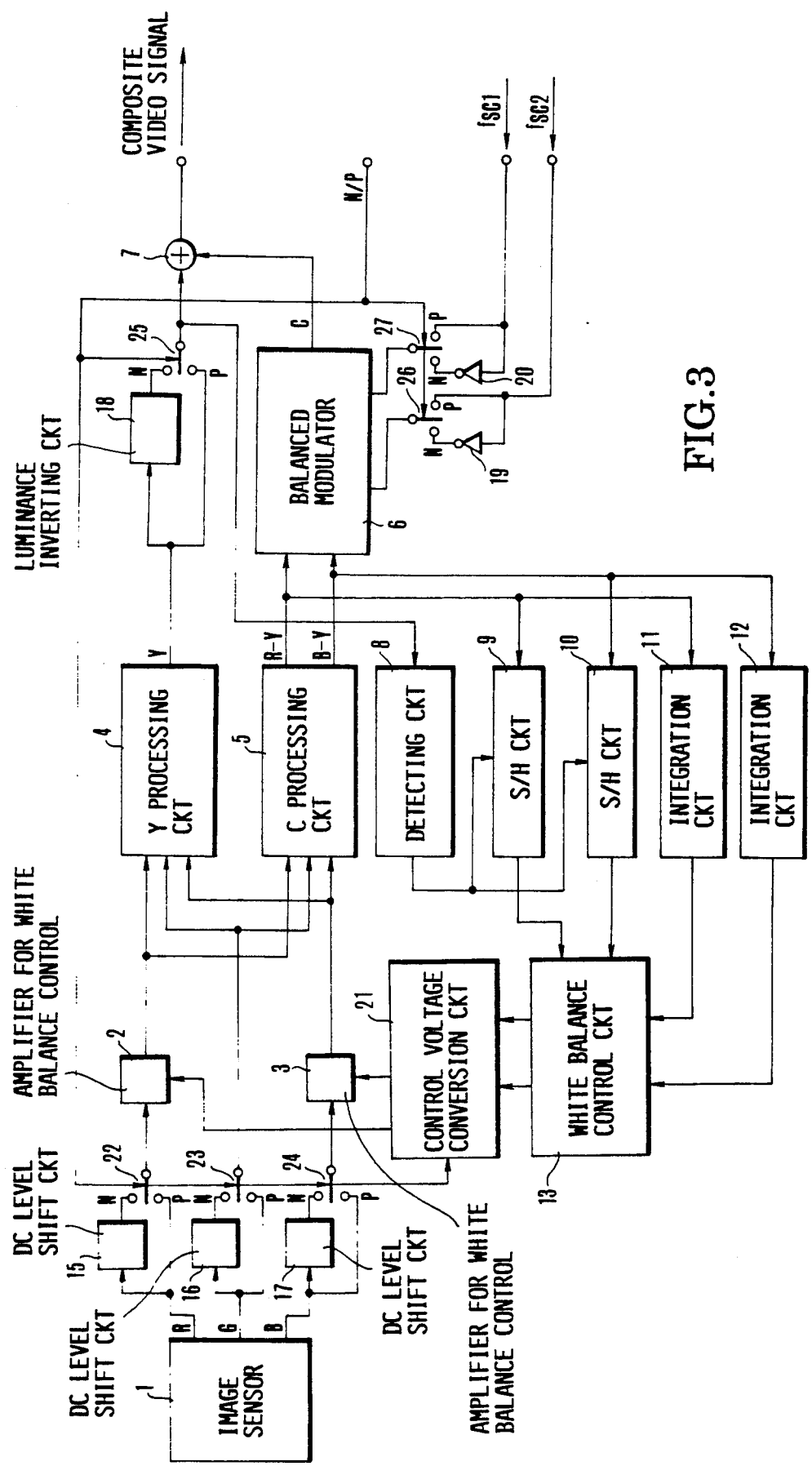
FIG. 3 is a block diagram of the circuitry of an embodiment of a color video camera according to the invention.

FIG. 3 is a block diagram that shows the essential parts of an embodiment of a color video camera according to the invention and, in particular, the construction of a white balance adjusting circuit. In the figure, the parts denoted by reference numerals 1 to 13 are similar to those shown by the same numerals in FIG. 1 and explanation thereof is omitted.

In FIG. 3, the image sensor 1 is provided with DC level shift circuits 15, 16 and 17 for shifting the DC levels of the color signals R, G and B. The color signals R, G and B are supplied through the respective DC level shift circuits 15, 16 and 17 to the amplifiers 2 and 3 for white balance control, the Y processing circuit 4 and the C processing circuit 5. To invert the polarity of the luminance signal, the output of the Y processing circuit 4 is connected to the input of a luminance inverting circuit 18. The high-luminance portion (peak value) of the luminance signal of inverted polarity is detected by the detecting circuit 8. Responsive to the detection signal, the sample-and-hold circuits 9 and 10 sample and hold the color-difference signals R-Y and B-Y. The phases of the color subcarrier signals $f_{SC1}$ and $f_{SC2}$ are inverted by inverters 19 and 20, respectively. A control voltage conversion circuit 21 is responsive to selection of the negative-to-positive reversal mode for changing the values of the gains of the amplifiers 2 and 3 for white balance control. Thus, each of the amplifier 2 and 3 is controlled so that the gain becomes suited for shooting the color negative film. Changeover switches 22 to 27 put inputs at their fixed contacts P and N selectively to their outputs so that the ordinary mode (P) of shooting an object and the reversal mode (N) of shooting the color negative film to obtain the positive picture are selectively operated.

Figure 4:
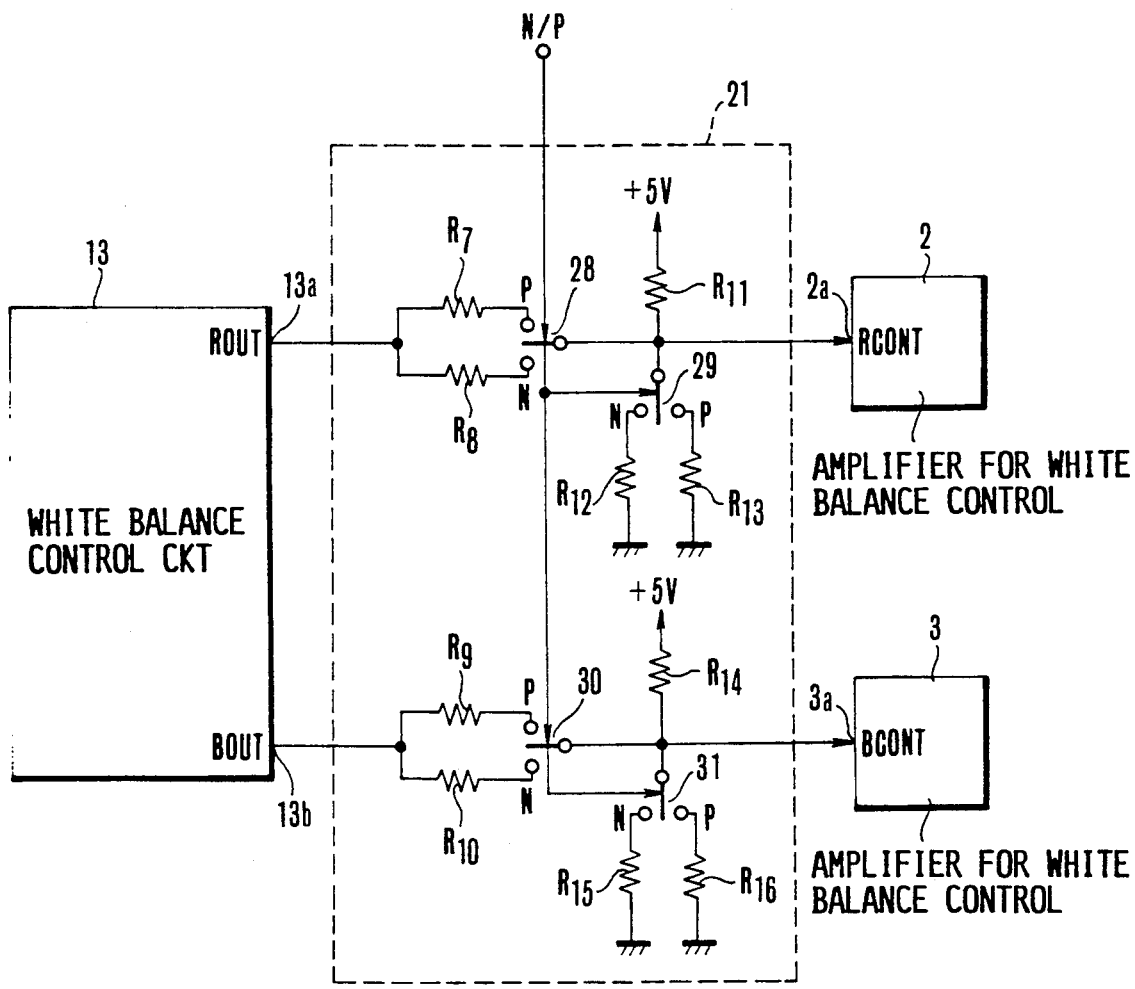
FIG. 4 is a circuit diagram of the details of the control voltage conversion circuit shown in FIG. 3.

FIG. 4 shows the details of the construction of the control voltage conversion circuit 21 described above. In the figure, resistors $R_7$ and $R_8$, or $R_9$ and $R_{10}$, are connected in parallel to each other, and these pairs are connected individually to the respective output terminals 13a and 13b of the D-A converter in the white balance control circuit 13. A resistor $R_{11}$ and a pair of resistors $R_{12}$ and $R_{13}$ constitute a bleeder connected to a D.C. electric power source of +5 volts. A resistor $R_{14}$ and a pair of resistors $R_{15}$ and $R_{16}$ constitute another bleeder connected to the same source. Changeover switches 28 to 31 select one of the resistors in each pair when the ordinary object shooting mode is changed to the negative-to-positive reversal mode, or vice versa.

Next, the operation is described.

Figure 2:
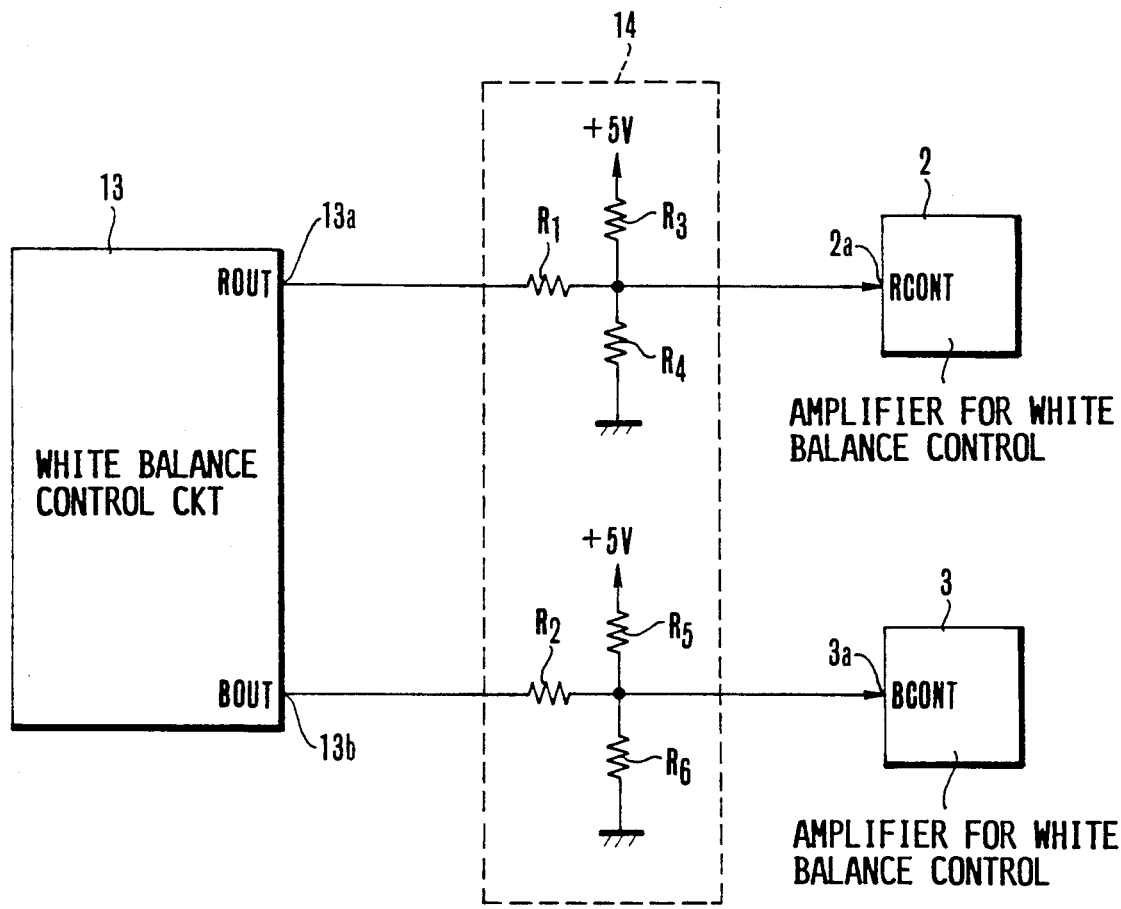
FIG. 2 is a circuit diagram of the details of the control voltage conversion circuit shown in FIG. 1.

In the ordinary object shooting mode, the negative-positive changeover signal N/P becomes an actuating signal for P (positive), thereby moving all the changeover switches 22 to 27 of FIG. 3 and the others 28 to 31 of FIG. 4 to the P side. With this, the signals R, G and B which are to be supplied to the amplifiers 2 and 3 for white balance control and the Y and C processing circuits 4 and 5 become signals whose DC levels are not shifted, and the luminance inverting circuit 18 and the inverters 19 and 20 do not function. Also, the control voltage conversion circuit 21 has the same feature as that of the prior art shown in FIG. 2. Hence, the control terminals of the amplifiers 2 and 3 for white balance control each are given such a DC voltage that their gains have a most suitable value to shoot an object to be photographed. And, a composite video signal whose white balance has been adjusted to optimum is output to a reproduction circuit (not shown).

When shooting the color negative film, that is, in the negative-to-positive reversal mode, the aforesaid changeover signal N/P functions as an actuating signal for N (negative). Therefore, all the changeover switches 22 to 31 move to their N positions. With this, all the signals R, G and B output from the image sensor 1 are individually shifted in DC level by the DC level shift circuits 15 to 17. Hence, the DC level shift circuits 15 to 17 produce color signals in which the colors of an orange system with which the base of the color negative film is colored have been canceled out. And, the R and B signals are supplied to the respective amplifiers 2 and 3 for white balance control where their amplitudes are controlled, and therefrom supplied to the Y processing circuit 4 and the C processing circuit 5, while the G signal is supplied directly to the Y processing circuit 4 and the C processing circuit 5.

Then, the Y processing circuit 4 produces a luminance signal (Y signal) and the C processing circuit 5 produces two color-difference signals R-Y and B-Y. Since these signals are obtained from the negative film by shooting, their polarity is opposite to that when the aforesaid object shooting mode is operated. For this reason, the luminance signal has to be inverted to positive polarity by the luminance inverting circuit 18. The two color-difference signals are, on the other hand, allowed to enter the balanced modulator 6 without any further treatment. Since the color subcarrier signals $f_{SC1}$ and $f_{SC2}$ supplied to the balance modulator 6 are, however, in the phase inversion, the chrominance signal (C signal), too, to be output from the balanced modulator 6 is inverted to the positive polarity. These positive inverted-in-polarity luminance and chrominance signals are mixed in the addition circuit 7, which then produces a normal composite video signal.

Again, the positive inverted-in-polarity luminance signal is routed by the changeover switch 25 also to the detecting circuit 8. Thus, the high-luminance portion of the luminance signal can be detected in the normal way. Responsive to this detection signal, the sample-and-hold circuits 9 and 10 sample and hold the color-difference signals and, at the same time, the integration circuits 11 and 12 integrate the color-difference signals. Based on the outputs of these circuits 9 to 12, the white balance control circuit 13 controls the gains of the amplifiers 2 and 3 by means of the control voltage conversion circuit 21.

Here, though the aforesaid sample-and-hold circuits 9 and 10 and the integration circuits 11 and 12 operate in similar manners to those in the ordinary object shooting mode, the gains of the amplifiers 2 and 3 are changed over by the control voltage conversion circuit 21 to the values suited for shooting the negative film. That is, the control voltage conversion circuit 21 of FIG. 4 is operated with the changeover switches 28 to 31 all moved to their N positions. In this condition, the most apposite control voltages for the negative-to-positive reveral mode are applied to the control terminals 2a and 3a of the amplifiers 2 and 3, since the values of the resistors $R_8$, $R_{10}$, $R_{12}$ and $R_{15}$ are so set by taking the resistors $R_{11}$ and $R_{14}$ as the reference. Thus, the optimum white balance adjustment is carried out.

In such a manner, the variation width and central value of the control voltage to be applied to the control terminal of each of the amplifiers 2 and 3 is made to change so that the ordinary object shooting mode and the negative-to-positive reversal mode are selectively set, thus controlling each gain properly. Hence, the optimum white balance adjustment can always be assured.

As has been described above, according to the present embodiment, the gains of the amplifiers for white balance control are made variable so that in the negative-to-positive reversal mode, the color signals are amplified to the level suited for shooting the negative film. This produces an advantage in that the camera can operate with a selection of the ordinary object shooting mode or the negative-to-positive reversal mode in such a manner as to insure that the optimum white balance adjustment is done at all times as the gains of the amplifiers for white balance control are changed over between the adequate values.

Also, according to the embodiment described above, in the negative-to-positive reversal mode, the luminance signal, after having been inverted to the positive polarity, is used for detecting the high-luminance portion to do sampling of the color-difference signals. Another advantage arises in that even in the negative-to-positive reversal mode, the high-luminance portion of the luminance signal can be detected with high reliability, thus contributing to the good stability of optimum white balance adjustment.

Further, according to the embodiment described above, to obtain a positive picture from the color negative film, it is in the preceding stage of the amplifiers 2 and 3 for white balance control that the color signals output from the image sensor 1 are subjected to a DC level shift. Thus, the influence of the colors of an orange system with which the base of the color negative film is colored is removed before the color signals are used to control the white balance. An additional advantage is, therefore, produced in that the white balance can be controlled always with high accuracy without suffering from the base colors.

What is claimed is:

1. An image sensing apparatus which has a positive mode and a negative mode, comprising:
   a. image sensing means for sensing an image of an object to form an image signal which includes a plurality of color signal components;
   b. signal processing means for processing the image signal to produce a video signal, said processing means changing a polarity of the video signal between the positive mode and the negative mode;
   c. level adjusting means for adjusting levels of the plurality of color signal components;
   d. signal forming means for forming a control signal to control said level adjusting means in accordance with a color temperature condition of the object; and
   e. changing means arranged between said level adjusting means and said control signal forming means for changing a gain of the control signal between the positive mode and the negative mode.

2. An apparatus according to claim 1, wherein said control signal forming means forms a plurality of control signals for the plurality of color signal components, said changing means being arranged to change gains of the plurality of control signals respectively.

3. An apparatus according to claim 1, wherein said control signal forming means forms the control signal by using color signals according to the color signal components levels of which are adjusted by said level adjusting means.

4. An apparatus according to claim 3, wherein said control signal forming means includes an averaging circuit for averaging the color signal components to produce average values of said color signal components, and wherein the control signal is operable to make the average values zero.

5. An apparatus according to claim 1, wherein said signal processing means includes luminance producing means for producing a luminance signal and luminance inverting means for inverting the luminance signal only in the negative mode, and wherein said control signal forming means forms the control signal by using the luminance signal processed through said luminance inverting means.

6. An apparatus according to claim 5, wherein said control signal forming means includes detection means for detecting a high-luminance portion of the luminance signal and sampling means for sampling color signals according to color signal components levels of which are adjusted by said level adjusting means.

7. An apparatus according to claim 1, further comprising removing means for removing the influence of colors of orange component with which a base of a color negative film is colored from the image signal formed by said image sensing means only in the negative mode.

8. An apparatus according to claim 7, wherein said removing means includes level shifting circuits for shifting levels of color signals output from said image sensing means.

9. An image sensing apparatus which has a positive mode and a negative mode comprising:
   a. image sensing means for sensing an image of an object to form an image signal which includes a plurality of color signal components;
   b. level shifting means for operating on and shifting DC levels of color signals output from said image sensing means in the negative mode to remove from the image signal the influence of colors of orange component with which a base of color negative film is colored;
   c. signal processing means for processing the image signal to produce a video signal, said processing means inverting the video signal between the positive mode and the negative mode;
   d. level adjusting means for adjusting levels of the plurality of color signal components; and
   e. control signal forming means for forming a control signal to control said level adjusting means by using color signals according to the color signal components which are processed through said level shifting means and said level adjusting means.

10. An apparatus according to claim 9, wherein said level shifting means is arranged to shift direct current levels of said color signals formed by said image sensing means.

11. An apparatus according to claim 9, wherein said level adjusting means comprises variable gain amplifiers.

12. An apparatus according to claim 11, comprising means for changing control signals of said variable gain amplifiers in the negative mode and in the positive mode.

13. An apparatus according to claim 9, further comprising switch means for selecting the negative mode and the positive mode.

14. An image sensing apparatus which has a positive mode and a negative mode, comprising:
   a. image sensing means for sensing an image of an object to form color image signals;
   b. level shifting means for operating one and shifting DC levels of color signals output from said image sensing means in the negative mode to remove from the image signal the influence of colors of orange component with which a base of color negative film is colored; and
   c. white balance control means for forming a white balance control signal to control white balance of the color image signal by using color signals according to the color signal components which are processed through said level shifting means and said white balance control means.

15. An apparatus according to claim 14, wherein said level shifting means is arranged to shift DC levels of said color signals formed by said image sensing means.

16. An apparatus according to claim 14, wherein said white balance control means comprises variable gain amplifiers.

17. An apparatus according to claim 16, comprising means for changing control signals of said variable gain amplifiers in the negative mode and in the positive mode.

18. An apparatus according to claim 14, further comprising switch means for selecting the negative mode and the positive mode.

19. An image pickup apparatus which has a positive mode and a negative mode, comprising:
  (a) image sensing means for sensing an image of an object to form color image signals;
  (b) level shifting means for operating on and shifting DC levels of the color signals to cancel a color component corresponding to a color of a film base in the negative mode; and
  (c) white balance control means for controlling white balance of said color signals based on the color signal levels adjusted by a level adjusting means.

20. An apparatus according to claim 19, wherein said level shifting means is arranged to shift direct current levels of said color signals formed by said image sensing means.

21. An apparatus according to claim 19, wherein said white balance control means comprises variable gain amplifiers.

22. An apparatus according to claim 21, comprising means for changing control signals of said variable gain amplifiers in the negative mode and in the positive mode.

23. An apparatus according to claim 19, further comprising switch means for selecting the negative mode and the positive mode.

24. An image sensing apparatus which has a positive mode and a negative mode, comprising:
  a. image sensing means for sensing an image of an object to form an image signal which includes a plurality of color signal components;
  b. signal processing means for processing the image signal to produce a video signal, said processing means changing a polarity of the video signal between the positive mode and the negative mode;
  c. level adjusting means for operating on and adjusting levels of the plurality of color signal components;
  d. signal forming means for forming a control signal to control said level adjusting means in accordance with a color temperature condition of the object; and
  e. changing means changing level adjusting condition of said level adjusting means between the positive mode and the negative mode.

25. An apparatus according to claim 24, wherein said control signal forming means forms a plurality of control signals for the plurality of color signal components, said changing means being arranged to change gains of the plurality of control signals respectively.

26. An apparatus according to claim 24, wherein said control signal forming means forms the control signal by using color signals according to the color signal components levels of which are adjusted by said level adjusting means.

27. An apparatus according to claim 24, wherein said control signal forming means includes an averaging circuit for averaging the color signal components to produce average values of said color signal components, and wherein the control signal is operable to make the average values zero.

28. An apparatus according to claim 24, wherein said signal processing means includes luminance producing means for producing a luminance signal and luminance signal processed through said polarity changing means.

29. An apparatus according to claim 28, wherein said control signal forming means includes detection means for detecting a high-luminance portion of the luminance signal and sampling means for sampling color signals according to color signal components levels of which are adjusted by said level adjusting means.

30. An apparatus according to claim 24, further comprising removing means for removing the influence of colors of orange component with which a base of a color negative film is colored from the image signal formed by said image sensing means only in the negative mode.

31. An apparatus according to claim 30, wherein said removing means includes level shifting circuits for shifting levels of color signal output from said image sensing means.

* * * * *

UNITED STATES PATENT AND TRADEMARK OFFICE
CERTIFICATE OF CORRECTION

PATENT NO. : 5,329,362
DATED : July 12, 1994
INVENTOR(S) : Takaiwa

It is certified that error appears in the above-indentified patent and that said Letters Patent is hereby corrected as shown below:

Col. 1, line 25, after "type" insert --uses--

Col. 2, line 37, change "obtain always" to --always obtain--

Col. 3, line 21, change "reliably be" to --be reliably--

Col. 3, line 28, change "the" to --a--

Col. 6, line 43, change "reveral" to --reversal--

Col. 8, line 57, change "one" to --on--

Signed and Sealed this

Eleventh Day of October, 1994

BRUCE LEHMAN

Attest:

*Attesting Officer*     *Commissioner of Patents and Trademarks*